UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

SYSTEM OF MOTOR CONTROL.

1,003,431.  Specification of Letters Patent.  Patented Sept. 19, 1911.

Application filed April 9, 1909. Serial No. 488,841.

*To all whom it may concern:*

Be it known that I, ALEXANDER CHURCHWARD, a citizen of the United States, residing at New York, in the county of New York, State of New York, have invented certain new and useful Improvements in Systems of Motor Control, of which the following is a specification.

My invention relates to systems of control for electric motors and particularly for motors employed for propelling vehicles and the like.

Regenerative braking systems of motor control are particularly advantageous when employed on motor driven vehicles in which Edison storage batteries are used. Such storage batteries, when they are called on for heavy rates of discharge, do not recover their electromotive force when the discharge returns to normal. However, any sudden charge of even short duration will tend to freshen them up and increase their effective voltage.

Heretofore, when regenerative braking systems have been used on vehicles driven by a series motor supplied with current from storage batteries, the battery was often injured by the rush of current incident to the changing over of the motor to a series generator. To avoid this rush of current I operate my motor as a series machine when it is operating as a motor and as a cumulative compound generator when it is overhauled by the load. In order to do this, I insert a shunt field across the armature of the motor in the braking position and reverse the connections of the series winding.

Other features of novelty which characterize my invention are pointed out in the claims annexed to and forming a part of this specification. For a better understanding of my invention, however, reference may be had to the following description taken in connection with the accompanying drawings, in which—

Figure 1:
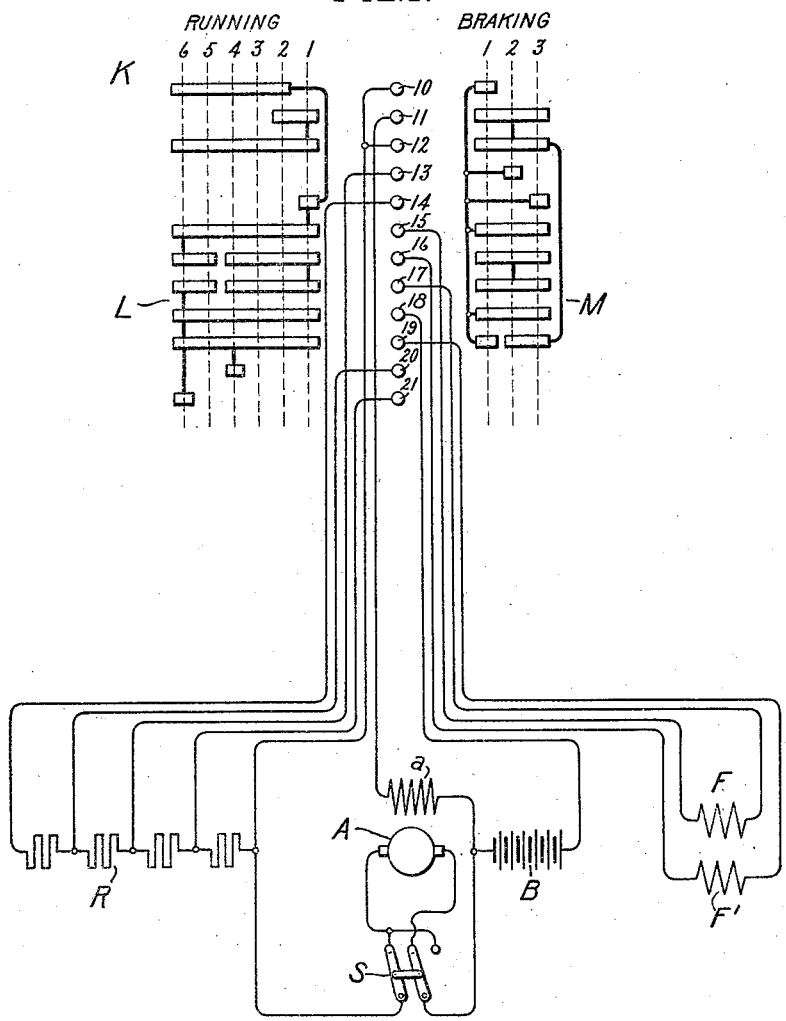
Figure 6:
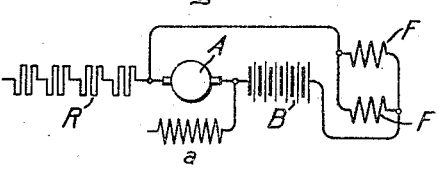
Figure 7:
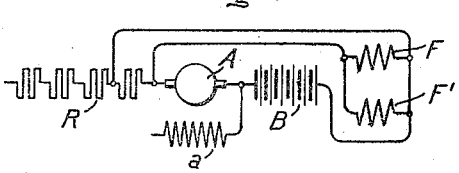
Figure 8:
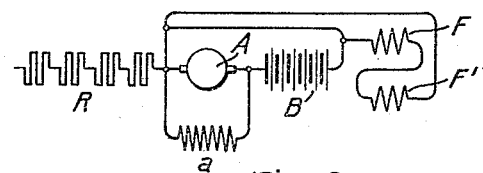
Figure 9:
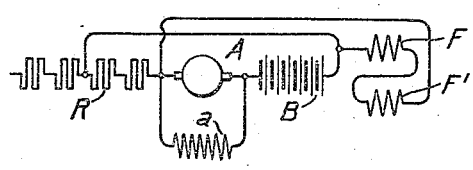
Figure 10:
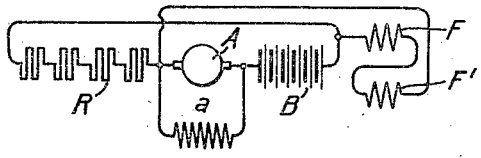

Figure 1 is a diagrammatic representation of a control system arranged in accordance with my invention; Figs. 2 to 7, inclusive, show motor connections when the motor is operating as a motor, and Figs. 8, 9 and 10 show the motor connections when the motor is operating as a generator.

Similar reference characters will be used throughout the specification and drawings to denote like parts.

Reference being had to Fig. 1, the motor for driving the vehicle has an armature A, the shunt field winding a, and the series field winding made up of the coils F and F'. K is the motor controller which consists of the row of fixed contacts 10 to 21 inclusive, and the two sets of movable contacts L and M. R is a resistance to which the fixed contacts 13, 14, 20 and 21 are connected. S is a reversing switch for reversing the connections of the armature A, and B is a storage battery for supplying power to the system.

Figure 2:
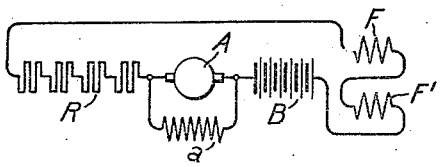
Figure 3:
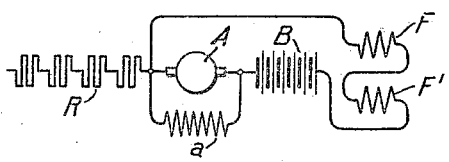
Figure 4:
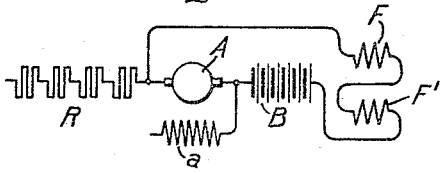
Figure 5:
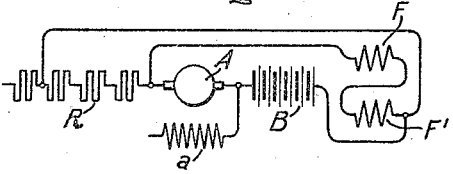

When it is desired to start the vehicle in a forward direction, the switch S is thrown to the position for forward movement and the controller is turned so as to bring the fixed contacts into engagement with the contacts L. In the first running position, the connections are as shown in Fig. 2, the motor being connected to the battery as a cumulative compound motor in series with the total resistance R. The movement of the controller to the second running position gives the connections shown in Fig. 3, which is similar to Fig. 2, except that the resistance is cut out of circuit. A further movement of the controller gives the connections shown in Fig. 4, in which the shunt field has been disconnected, so that the motor now operates as a series motor. By leaving the shunt field in circuit for the first two running positions, it is possible to get a low running speed in the second position without wasting power in heating up the resistance R. Such a speed position is advantageous when it is desired to run a vehicle in crowded thoroughfares and over railroad crossings. The further movement of the controller into the fourth position gives the connections shown in Fig. 5, and a higher running speed is obtained because the series field winding is shunted across a portion of the resistance R. Still higher speeds may be obtained in the fifth and sixth position of controller, the connections for which are shown in Figs. 6 and 7, in which the series field coils are placed in parallel. Position six is similar to position five, except that the series field coils are shunted across a portion of the resistance R. In case it is desired to reverse the direction of travel of the vehicle, the switch S is thrown into the position for reverse movement and the controller moved in the same direction as before.

When the vehicle is descending a grade it is desirable to brake it electrically and to recharge the storage battery, especially when this battery is of the Edison type, as explained above. In order to do this, the controller is turned in the opposite direction, bringing the contacts M into engagement with the row of fixed contacts. In the first braking or regenerative position, the connections are as shown in Fig. 8, in which the motor is connected across the battery as a shunt machine, the series field winding being reversed, but short circuited. In the second regenerative position, the connections for which are shown in Fig. 9, the series field winding is shunted across a portion of the resistance R, so that some of the current generated by the motor acting as a dynamo flows through the series field winding which now has its connections reversed as pointed out above, so that it assists the shunt field winding to increase the voltage generated by the motor, and thus the battery receives a charge. If it is desired to increase the voltage generated by the motor and thus its braking effect, the controller is turned to the third braking position, the connections for which are shown in Fig. 10 and are similar to the connections shown in Fig. 9, except that the series field is shunted by the whole resistance R and, consequently, most of the current generated by the motor flows through it.

By using the system of my invention all braking, whether on the level or going down hill, may be done by making the motor run as a generator, and each time the braking action occurs a small increment of charge will be added to the battery which, when it is of the Edison type, as explained above, will freshen up the battery and increase its effective voltage, so that the motor may be operated at full voltage and, therefore, at full speed until the battery charge is exhausted.

Although I have described my invention in great detail as embodied in a preferred form, it is, of course, understood that many changes may be made in the arrangement of the field windings and the manner and means for connecting them in order to produce the desired results, and I aim in the appended claims to cover all modifications within the spirit and scope of my invention.

What I claim as new and desire to secure by Letters Patent of the United States, is,

1. The method of controlling a motor, which consists in operating it as a series motor, and as a cumulative compound generator when it is overhauled by the load.

2. In a system of motor control, a source of power, a motor having a series and a shunt field winding, and means for connecting said motor as a series motor for running and as a cumulative compound generator when it is overhauled by the load.

3. In a system of motor control, a source of power, a motor having a series and a shunt field winding, and means for connecting said motor as a series motor for running and for connecting the shunt field winding in circuit and for reversing the series field winding when the motor is regenerating.

4. In a system of motor control, a source of power, a motor having a series and a shunt field winding, and means for connecting said motor as a series motor for running and for connecting the shunt field winding in circuit and for reversing and shunting the series field winding when the motor is regenerating.

5. In a system of motor control, a source of power, a motor having a series and a shunt field winding, and means for connecting the shunt field winding in circuit and for reversing and shunting the series field winding when the motor is regenerating and then increasing the resistance of the shunt so that more current flows through the series field winding.

6. In a system of motor control, a source of power, a motor having a series and a shunt field winding, a resistance, and means for connecting the shunt field winding in circuit and for reversing and shunting the series field winding across said resistance when the motor is regenerating.

7. In a system of motor control, a source of power, a motor having a series and a shunt field winding, a resistance, and means for connecting the shunt field winding in circuit and for reversing and shunting the series field winding across said resistance when the motor is regenerating and then increasing the amount of said resistance which is placed in shunt with the series field winding.

8. In a system of motor control, a source of power, a motor having a series and a shunt field winding, and a controller for connecting said motor as a series motor for running and as a cumulative compound generator when it is overhauled by the load.

9. In a system of motor control, a source of power, a motor having a series and a shunt field winding, and a controller for connecting said motor as a series motor for running and for connecting the shunt field winding in circuit and for reversing the series field winding when the motor is regenerating.

10. In a system of motor control, a source of power, a motor having a series and a shunt field winding, and a controller for connecting said motor as a series motor for running and for connecting the shunt field winding in circuit and for reversing and shunting the series field winding when the motor is regenerating.

11. In a system of motor control, a source of power, a motor having a series and a shunt field winding, and a controller for connecting the shunt field winding in circuit and for reversing and shunting the series field winding when the motor is regenerating and then increasing the resistance of the shunt so that more current flows through the series field winding.

12. In a system of motor control, a source of power, a motor having a series and a shunt field winding, a resistance, and a controller for connecting the shunt field winding in circuit and for reversing and shunting the series field winding across said resistance when the motor is regenerating.

13. In a system of motor control, a source of power, a motor having a series and a shunt field winding, a resistance, and means for connecting the shunt field winding in circuit and for reversing and shunting the series field winding across said resistance when the motor is regenerating and then increasing the amount of said resistance which is placed in shunt with the series field winding.

14. In a motor driven vehicle, a storage battery, a driving motor having a series and a shunt field winding, and means for connecting said motor to said battery as a series motor for running and as cumulative compound generator when it is overhauled by the load.

15. In a motor driven vehicle, a storage battery, a driving motor having a series and a shunt field winding, and means for connecting the shunt field winding in circuit and for reversing the series field winding when the motor is regenerating.

16. In a motor driven vehicle, a storage battery, a driving motor having a series and a shunt field winding, a resistance, and means for connecting said motor to said battery as a series motor for running and for connecting the shunt field winding in circuit and reversing the series field winding and shunting it across said resistance when the motor is regenerating.

17. In a motor driven vehicle, a storage battery, a driving motor having a series and a shunt field winding, a resistance, and means for connecting said motor to said battery as a series motor and shunting the series field winding by more or less of said resistance for running and for connecting the shunt field winding in circuit and reversing and shunting the series field winding across more or less of said resistance when the motor is regenerating.

In witness whereof, I have hereunto set my hand this seventh day of April, 1909.

ALEXANDER CHURCHWARD.

Witnesses:
EDWIN B. H. TOWER,
D. ALLEN ROBERTSON.

---

Copies of this patent may be obtained for five cents each, by addressing the "Commissioner of Patents, Washington, D. C."